US012317999B2

(12) United States Patent
Liu et al.

(10) Patent No.: US 12,317,999 B2
(45) Date of Patent: Jun. 3, 2025

(54) TWISTABLE AND STACKABLE SHELF AND CONNECTING DEVICE THEREOF

(71) Applicant: GUANGDONG WIREKING HOUSEWARES & HARDWARE CO., LTD, Foshan (CN)

(72) Inventors: Nengwen Liu, Foshan (CN); Jianbin Wu, Foshan (CN); Feifei Li, Foshan (CN); Jingyuan Liang, Foshan (CN)

(73) Assignee: GUANGDONG WIREKING HOUSEWARES & HARDWARE CO., LTD, Foshan (CN)

( * ) Notice: Subject to any disclaimer, the term of this patent is extended or adjusted under 35 U.S.C. 154(b) by 346 days.

(21) Appl. No.: 17/739,154

(22) Filed: May 8, 2022

(65) Prior Publication Data
US 2023/0309692 A1    Oct. 5, 2023

(30) Foreign Application Priority Data
Mar. 30, 2022   (CN) .......................... 202220721731.5

(51) Int. Cl.
*A47B 87/02*   (2006.01)
*F16B 7/04*   (2006.01)
*F16B 12/40*   (2006.01)

(52) U.S. Cl.
CPC .......... *A47B 87/0223* (2013.01); *F16B 7/042* (2013.01); *F16B 2012/403* (2013.01);
(Continued)

(58) Field of Classification Search
CPC ...... F16B 7/04136; F16B 7/042; F16B 7/105; F16B 7/1481; F16B 7/149; F16B 12/40;
(Continued)

(56) References Cited

U.S. PATENT DOCUMENTS

| 3,437,059 A | * | 4/1969 | James | ....................... E06B 9/01 |
| | | | | 248/200.1 |
| 4,266,678 A | * | 5/1981 | Daly | ..................... B65D 19/08 |
| | | | | 108/53.5 |

(Continued)

FOREIGN PATENT DOCUMENTS

| EP | 0476729 A1 | * | 3/1992 | ............. A47B 43/00 |
| EP | 1154167 A1 | * | 11/2001 | ............. A47B 13/02 |

(Continued)

*Primary Examiner* — Amber R Anderson
*Assistant Examiner* — Kevin J Baynes

(57) ABSTRACT

A twistable and stackable shelf includes storage members, an elastic member, a first supporting pipe, a second supporting pipe, a first connecting member, and a second connecting member. Each of the first and second connecting member includes an end portion defining an inserting hole and an inserting portion defining a bottom groove and fluidly connected to the inserting hole. Two ends of the elastic member are inserted into the inserting holes and extend to the bottom grooves; two hooking members are arranged in the bottom grooves. The first and second supporting pipes form a vertical arrangement through the first and second connecting members and support the plurality of the storage members in a vertical direction. Or, the first and second supporting pipes form a horizontal arrangement through the first and second connecting members, and the storage members are twisted and stacked in the vertical direction.

20 Claims, 10 Drawing Sheets

(52) U.S. Cl.
CPC .......... *Y10T 403/459* (2015.01); *Y10T 403/54* (2015.01); *Y10T 403/55* (2015.01)

(58) Field of Classification Search
CPC .......... F16B 2012/403; F16B 2012/406; F16B 7/0413; Y10T 403/451; Y10T 403/459; Y10T 403/54; Y10T 403/55; Y10T 403/598; A47B 87/02; A47B 87/0207; A47B 87/0215; A47B 87/0223; A47B 2087/023; A47B 2087/0238
USPC .......................................................... 211/189
See application file for complete search history.

(56) References Cited

U.S. PATENT DOCUMENTS

| | | | | |
|---|---|---|---|---|
| 4,491,438 | A * | 1/1985 | Berutti | A63C 19/062 40/608 |
| 4,578,919 | A * | 4/1986 | Amadon | B64G 99/00 52/645 |
| 5,029,783 | A * | 7/1991 | Alvarez | A47G 29/1216 40/608 |
| 5,149,282 | A * | 9/1992 | Donato | F21V 23/06 439/534 |
| 5,517,928 | A * | 5/1996 | Erdman | A47B 87/0207 403/375 |
| 5,607,250 | A * | 3/1997 | Tatterson | E21B 17/046 403/294 |
| 5,788,347 | A * | 8/1998 | Rabinovitz | H05K 5/0021 439/701 |
| 5,941,400 | A * | 8/1999 | Lemaire | F16B 7/0413 211/167 |
| 6,129,476 | A * | 10/2000 | Berman | B25J 19/063 403/220 |
| 6,257,797 | B1 * | 7/2001 | Lange | F16B 7/0413 403/292 |
| 6,260,488 | B1 * | 7/2001 | Yang | F16B 12/40 108/107 |
| 6,626,605 | B1 * | 9/2003 | Dean | F16B 7/0413 403/379.6 |
| 6,881,111 | B2 * | 4/2005 | Bridge | B63H 16/04 440/102 |
| 6,969,212 | B1 * | 11/2005 | Richens | E01F 9/629 404/10 |
| 7,186,050 | B2 * | 3/2007 | Dean | F16B 7/0413 403/379.6 |
| 7,537,016 | B1 * | 5/2009 | You | A45B 3/00 135/25.4 |
| 8,789,854 | B2 * | 7/2014 | Christian, Jr. | F16L 37/127 285/39 |
| 8,960,210 | B2 * | 2/2015 | Bacik | A45B 25/22 403/220 |
| 9,211,006 | B2 * | 12/2015 | Chen | A47B 87/0223 |
| 9,474,369 | B1 * | 10/2016 | Tsai | A47B 87/02 |
| 9,723,925 | B1 * | 8/2017 | Tsai | A47B 45/00 |
| 10,034,543 | B1 * | 7/2018 | Burnett | A47B 96/206 |
| 10,201,226 | B2 * | 2/2019 | Burnett | A47F 5/112 |
| 10,258,524 | B2 * | 4/2019 | Bally | A61G 7/0503 |
| 10,321,761 | B1 * | 6/2019 | Lai | A47B 87/0223 |
| 10,750,858 | B1 * | 8/2020 | Barre | A47B 45/00 |
| 11,001,286 | B2 * | 5/2021 | Liu | A47B 57/36 |
| 11,523,686 | B1 * | 12/2022 | Liu | A47B 96/06 |
| 2005/0163560 | A1 * | 7/2005 | Chene | F16C 11/06 403/229 |
| 2016/0010675 | A1 * | 1/2016 | Chu | F16B 7/182 403/296 |
| 2019/0150611 | A1 * | 5/2019 | Burnett | A47B 7/00 |

FOREIGN PATENT DOCUMENTS

| | | | | |
|---|---|---|---|---|
| FR | 1194257 | A * | 11/1959 | ............ F16B 7/0413 |
| FR | 2410183 | A1 * | 6/1979 | ............ F16B 7/0413 |

* cited by examiner

TWISTABLE AND STACKABLE SHELF AND CONNECTING DEVICE THEREOF

CROSS REFERENCE TO RELATED APPLICATIONS

This application claims foreign priority to Chinese Patent Application No. 202220721731.5, filed on Mar. 30, 2022, the contents of which are herein incorporated by reference in their entireties.

TECHNICAL FIELD

The described embodiments relate to the field of shelves, and more specifically, to a twistable and stackable shelf and a connecting device of the twistable and stackable shelf.

BACKGROUND

With the improvement of people's living standards, shelves for holding items are used in the home or other places. In order to hold or bear more items, the shelves are often designed in a multi-layer style and include a plurality of shelving layers, and the plurality of shelving layers are supported and fixedly connected to each other by means of supporting rods or supporting pipes.

At present, the plurality of shelving layers on the market are mainly supported in a vertical direction via integrated supporting rods or supporting pipes and further fixed by bolts. That is, overall shapes of the shelves are fixed or constant. Positions and orientations between the plurality of shelving layers have been fixed.

However, inventors of the present disclosure found that, in the related art, the shelves assembled by the integrated supporting rods or supporting pipes have relatively large sizes, and need to be assembled and disassembled repeatedly during transportation, which increases workload and wastes manpower and material resources. Besides, the shelves are nondeformable as a whole, and thus it will bring a lot of inconvenience when used in a limited space, which may lead to many technical problems such as inconvenient use and occupying large storage space.

SUMMARY

In view of this, in some embodiments of the present disclosure, a twistable and stackable shelf may be provided, which solves the problems in the related art that an existing shelf has a large volume and needs to be assembled and disassembly repeatedly during transportation, which increases workload and wastes manpower and material resources, and that it is inconvenience to use and occupies large storage space. A plurality of storage members arranged in the vertical direction are connected to each other via rotatable and foldable supporting pipes. Thus, during transporting and using, there is no need to repeatedly disassemble and assemble, the shelf can be unfolded and folded for storage, thereby effectively saving the space.

In one aspect of the present disclosure, a twistable and stackable shelf may be disclosed. The twistable and stackable shelf may include a plurality of storage members, configured to hold items; a supporting assembly, comprising a first supporting pipe and at least one second supporting pipe; a connecting assembly, comprising a first connecting member and at least one second connecting member, the first connecting member being connected to the first supporting pipe, and the at least one second connecting member being connected to a corresponding one of the second supporting pipe, wherein each of the first connecting member and the at least one second connecting member comprises an end portion and an inserting portion, the end portion defines an inserting hole, the inserting portion defines a bottom groove, and the inserting hole is fluidly connected to the bottom groove; an elastic member, having a first end and a second end opposite to the first end, the first end of the elastic member being inserted into the inserting hole of the first connecting member and extending to the bottom groove of the first connecting member, and the second end of the elastic member being inserted into the inserting hole of the second connecting member and extending to the bottom groove of the second connecting member; a first hooking member, arranged in the bottom groove of the first connecting member, and connected to the first end of the elastic member, and the first end of the elastic member being movably connected to the first connecting member through the first hooking member; and a second hooking member, arranged in the bottom groove of the second connecting member and connected to the second end of the elastic member, and the second end of the elastic member being movably connected to the second connecting member through the second hooking member. The first supporting pipe and the second supporting pipe are switchable between a vertical arrangement and a horizontal arrangement through the first connecting member and the second connecting member. In response to the first supporting pipe and the second supporting pipe being in the vertical arrangement, the first supporting pipe and the second supporting pipe support the plurality of storage members in a vertical direction; and in response to the first supporting pipe and the second supporting pipe being in the horizontal arrangement, the plurality of the storage members are twisted and stacked in the vertical direction.

In some embodiments, the inserting hole penetrates from the end portion towards the bottom groove, the inserting hole is fluidly connected to the bottom groove, and the inserting hole is in a cylindrical shape or a prismatic shape.

In some embodiments, the bottom groove is formed by extending from one end of the inserting portion away from the end portion towards a middle of the inserting portion, the bottom groove is fluidly connected to first opposite side faces of the inserting portion, and a bottom wall of the bottom groove is in an arc shape.

In some embodiments, the bottom groove has a bifurcation shape at one end of the inserting portion away from the end portion, such that two opposite side faces of the inserting portion are separated from each other.

In some embodiments, the first hooking member is arranged at the bottom wall of the bottom groove of the first connecting member, and the second hooking member is arranged at the bottom wall of the bottom groove of the second connecting member.

In some embodiments, a plurality of reinforcing ribs are arranged on an outer periphery of the inserting portion, one end of each of the reinforcing ribs extends towards one end of the inserting portion connected to the end portion, and the other end of the reinforcing rib extends towards the other end of the inserting portion away from the end portion.

In some embodiments, each of second opposite side faces of the inserting portion defines an operation hole, and the operation hole is fluidly connected to the inserting hole and the bottom groove; a fixing hole is defined at one side of the operation hole, the fixing hole penetrates the second opposite site side faces of the inserting portion and is fluidly connected to the bottom groove; a riveting hole is defined in each of the first supporting pipe and the second supporting pipe, and the riveting hole corresponds to the fixing hole defined in the inserting portion; the inserting portion of the first connecting member is inserted into the first supporting pipe, the inserting portion of the second connecting member is inserted into the second supporting pipe, and a fixing member is riveted with the fixing hole and the riveting hole.

In some embodiments, a restricting member is disposed on each of the end portion of the first connecting member and the end portion of the second connecting member, and a restricting hole is defined in each of the end portion of the first connecting member and the end portion of the second connecting member; the restricting member of the first connecting member matches with and is further engaged with the restricting hole of the second connecting member, and the restricting member of the second connecting member matches with and is further engaged with the restricting hole of the first connecting member; and the restricting member is hemispherical, cylindrical, prismatic, or conical.

In some embodiments, the restricting member, the restricting hole, and the inserting hole are on the same plane, and the restricting member and the restricting hole are arranged on two opposite sides of the inserting hole, respectively.

In some embodiments, the restricting member of the first connecting member and the restricting member of the second connecting member are staggered with each other, and the restricting hole of the first connecting member and the restricting hole of the second connecting member are staggered with each other.

In some embodiments, the twistable and stackable shelf further includes a locking member. The locking member is arranged on inner side faces at connecting ends of the first supporting pipe and the second supporting pipe, and the first supporting pipe forms a vertical fixed connection with the second supporting pipe through the locking member; wherein the inner side faces face the plurality of storing members.

In some embodiments, the locking member comprises a latching element, an upper locking element, and a lower locking element, the upper locking element is fixedly connected to the inner side face of the first supporting pipe, the lower locking element is fixedly connected to the inner side face of the second supporting pipe, and the latching element is movably connected to the upper locking element and the lower locking element; the upper locking element has an upper engaging notch and a lower engaging notch, and an upper end of the latching element is engaged with the upper engaging notch or the lower engaging notch.

In some embodiments, the twistable and stackable shelf further includes a locking member, wherein the locking member is arranged on outer side faces at connecting ends of the first supporting pipe and the second supporting pipe, and the first supporting pipe forms a vertical fixed connection with the second supporting pipe through the locking member, wherein the outer side faces face away from the plurality of storing members; a side of the locking member facing the first supporting pipe and the second supporting pipe defines an opening, and the locking member is assembled to the first supporting pipe and the second supporting pipe through the opening. A side face of the locking member opposite to the opening defines a guiding groove, and the guiding groove matches with a fixing member connected to the first supporting pipe and a fixing member connected to the second supporting pipe.

In some embodiments, the guiding groove protrudes from an inner side face of the locking member towards an outer side face of the locking member; the fixing member connected to the first supporting pipe is slid into the guiding groove, and the locking member is located above the fixing member connected to the second supporting pipe.

In some embodiments, the first hooking member is horizontally disposed in the bottom groove of the first connecting member and the second hooking member is horizontally disposed in the bottom groove of the second connecting member; when the first end of the elastic member is hooked with the first hooking member and the second end of the elastic member is hooked with the second hooking member, the first hooking member abuts against a bottom wall of the bottom groove of the first connecting member, and the second hooking member abuts against a bottom wall of the bottom groove of the second connecting member.

In some embodiments, when the first end of the elastic member extends into the inserting hole of the first connecting member and is further hooked with the first hooking member and the second end of the elastic member extends into the inserting hole of the second connecting member and is further hooked with the second hooking member, the end portion of the first connecting member abuts against the end portion of the second connecting member.

In some embodiments, the first connecting member and the second connecting member are generally coaxially arranged via the elastic member, and the first connecting member are twistable with respect to the second connecting member.

In some embodiments, the number of the second supporting pipes is one, and the number of the connecting assembly is one, the connecting assembly is arranged between the first supporting pipe and one second supporting pipe; or the number of the second supporting pipes is two or more, and the number of the connecting assemblies is two or more, wherein one of the two or more connecting assemblies is arranged between the first supporting pipe and one of the second supporting pipes, and the other of the two or more connecting assemblies are arranged between every two adjacent of the second supporting pipes.

In some embodiments, the number of the connecting assemblies corresponds to the number of the second supporting pipes in a one-to-one correspondence.

In another aspect of the present disclosure, a connecting device for connecting and supporting a plurality of storage members of a twistable and stackable shelf may be disclosed. The connecting device may include a supporting assembly, comprising a first supporting pipe and at least one second supporting pipe; a connecting assembly, comprising a first connecting member and at least one second connecting member, the first connecting member being connected to the first supporting pipe, and the at least one second connecting member being connected to a corresponding one of the second supporting pipe, wherein each of the first connecting member and the at least one second connecting member comprises an end portion and an inserting portion, the end portion defines an inserting hole, the inserting portion defines a bottom groove, and the inserting hole is fluidly connected to the bottom groove; an elastic member, having a first end and a second end opposite to the first end, the first end of the elastic member being inserted into the inserting hole of the first connecting member and extending to the bottom groove of the first connecting member, and the second end of the elastic member being inserted into the inserting hole of the second connecting member and extending to the bottom groove of the second connecting member; a first hooking member, arranged in the bottom groove of the first connecting member, and connected to the first end of the elastic member, and the first end of the elastic member being movably connected to the first connecting member through the first hooking member; and a second hooking member, arranged in the bottom groove of the second connecting member and connected to the second end of the elastic member, and the second end of the elastic member being movably connected to the second connecting member through the second hooking member. The first supporting pipe and the second supporting pipe are switchable between a vertical arrangement and a horizontal arrangement through the first connecting member and the second connecting member. In response to the first supporting pipe and the second supporting pipe being in the vertical arrangement, the first supporting pipe and the second supporting pipe support the plurality of storage members in a vertical direction; and in response to the first supporting pipe and the second supporting pipe being in the horizontal arrangement, the plurality of the storage members are twisted and stacked in the vertical direction.

The twistable and stackable shelf provided in some embodiments of the present disclosure has at least the following technical effects.

By using at least two supporting pipes to support and connect the plurality of storage members, the connecting ends of the two supporting pipes are respectively fixedly connected to the connecting members, and each of the connecting members has the end portion and the inserting portion. The inserting portion is configured to be inserted or plugged into the pipe hole of the corresponding supporting pipe, and the elastic member is connected to the end portions of the corresponding connecting members, that is to say, the two connecting members of the two supporting pipes may be movably connected to each other via the elastic member. The two supporting pipes may achieve the vertical arrangement and a vertical-twistable arrangement under the action of the movable connection of the connecting members. Furthermore, since the plurality of storing members are vertically supported and connected by a plurality of supporting pipes, when the plurality of supporting pipes are vertically twisted and stacked, the plurality of storing members may be driven to be stacked in the vertical direction, and there is no need to repeatedly disassemble and assemble. In this way, it is possible to save space, besides, it is convenient to use, carry, and store.

Figure 1:
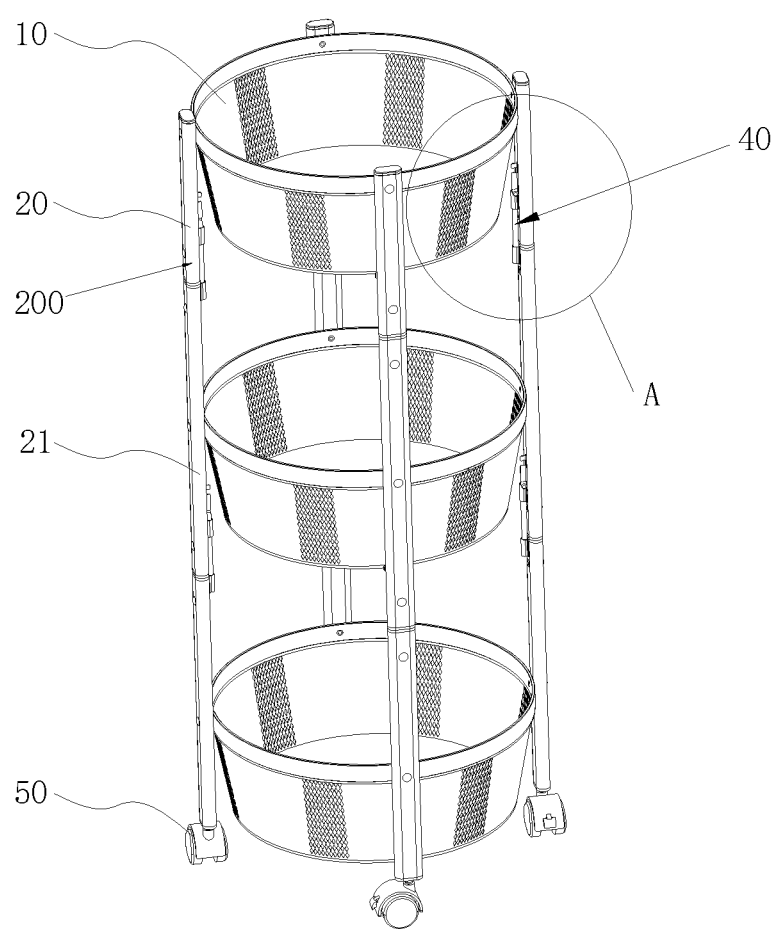
FIG. 1 illustrates an overall perspective view of a twistable and foldable shelf in a first embodiment of the present disclosure.

In the drawings, the numerals of the components are set forth as follow.

10. storing member; 101, surrounding ring; 102, fastening ring; 103, surrounding net;
20. first supporting pipe; 21, second supporting pipe;
30, first connecting member; 31, second connecting member; 301, end portion; 3011, inserting hole; 3012, restricting member; 3013, restricting hole; 302, inserting portion; 3021, bottom groove; 3022, reinforcing rib; 3023, operation hole; 3024, fixing hole; 303, elastic member; 304, hooking member; 305, fixing member;
40, locking member; 401, latching element; 402, upper locking element; 4021, upper engaging notch; 4022, lower engaging notch; 403, lower locking element;
40a, opening; 40b, guiding groove;
50. caster.

DETAILED DESCRIPTION

In some embodiments of the present disclosure, a twistable and foldable shelf may be provided, which solves the problems in the related art that an existing shelf has a large volume and needs to be assembled and disassembly repeatedly during transportation, which increases workload and wastes manpower and material resources, and that it is inconvenience to use and occupies large storage space.

In order to better understand the technical solution, the technical solution will be described in detail below with reference to the accompanying drawings and specific embodiments.

First Embodiment

As shown in FIGS. 1-7, a twistable and foldable shelf is provided. The shelf may substantially include a plurality of storage members 10 configured to hold or bear or place objects or items, a supporting assembly 200, a connecting assembly 300, and an elastic member 303. The storing member 10 includes an enclosing net or a surrounding net 103, a fastening ring 102, and a surrounding ring 101. Each storing member 10 may be configured in shape of a truncated cone or a cylinder. In some embodiments of the present disclosure, the storing member 10 may be in shape of the truncated cone, and the storing member 10 may be a hanging basket, a hanging box, a hanging case, or the like. The storing member 10 in shape of the truncated cone may have a first end and a second end opposite to the first end. The first end is oriented upwardly and the second end is oriented downwardly. That is, the first end is located above the second end along a vertical direction of the shelf. In this case, the vertical direction may be a direction substantially parallel to the gravity direction, and the first end is located at a level higher than the second end. The first end has an inner diameter greater than an inner diameter of the second end. The first end is opened, and the second end is enclosed or sealed. Therefore, the enclosing net 103, the fastening ring 102, and the enclosure ring 101 are assembled from top to bottom in sequence. That is, the surrounding ring 101 may be arranged on an edge of the first end of the storing member 10, the fastening ring 102 may be arranged under or below the surrounding ring 101, the enclosing net 103 may be arranged under the fastening ring 102, and the second end of the storing member 10 may be sealed, so as to finish the manufacturing of the storing member 10.

In some embodiments, one or more supporting assembly 200 may be provided. As shown in FIG. 1, four supporting assemblies 200 may be provided. The four supporting assemblies 200 may be spaced apart from each other along a peripheral direction of each storage members 10, to better support the storage members 10. Of course, in other embodiments, the number of the supporting assemblies may be set as other, such as two, three, five, or more, which will not be limited in some embodiments of the present disclosure.

Each supporting assembly 200 in some embodiments of the present disclosure includes a first supporting pipe 20 and at least one second supporting pipe 21. Each of the first supporting pipe 20 and the second supporting pipe 21 is a hollow flat pipe or a hollow round pipe. A plug may be arranged at an upper end of the supporting assembly, and a caster 50 may be detachably assembled to a lower end of the supporting assembly. The caster 50 may be slidable in a plurality of directions. By assembling the caster 50 at the lower end of the supporting assembly, it is convenient to transport the shelf and adjust an using position of the shelf.

The connecting assembly 300 may be connected between the first supporting pipe 20 and one second supporting pipe 21, or connected between every two adjacent second supporting pipes 21 in case that two or more second supporting pipes 21 are provided. Thus, one or more connecting assembly may be provided. In case that only one second supporting pipe 21 exists in each supporting assembly, then for each supporting assembly, one connecting assembly is provided between the first supporting pipe 20 and one second supporting pipe 21. In case that two or more second supporting pipes 21 exist in each supporting assembly, two or more connecting assemblies may be provided, the connecting assemblies may be arranged between the first supporting pipe 20 and one second supporting pipe 21 and between every two adjacent second supporting pipes 21. The number of the connecting assemblies corresponds to the number of the second supporting pipes in a one-to-one correspondence. As shown in FIG. 1, two connecting assemblies may be provided, and thus, two connecting assemblies may be provided.

Figure 5:
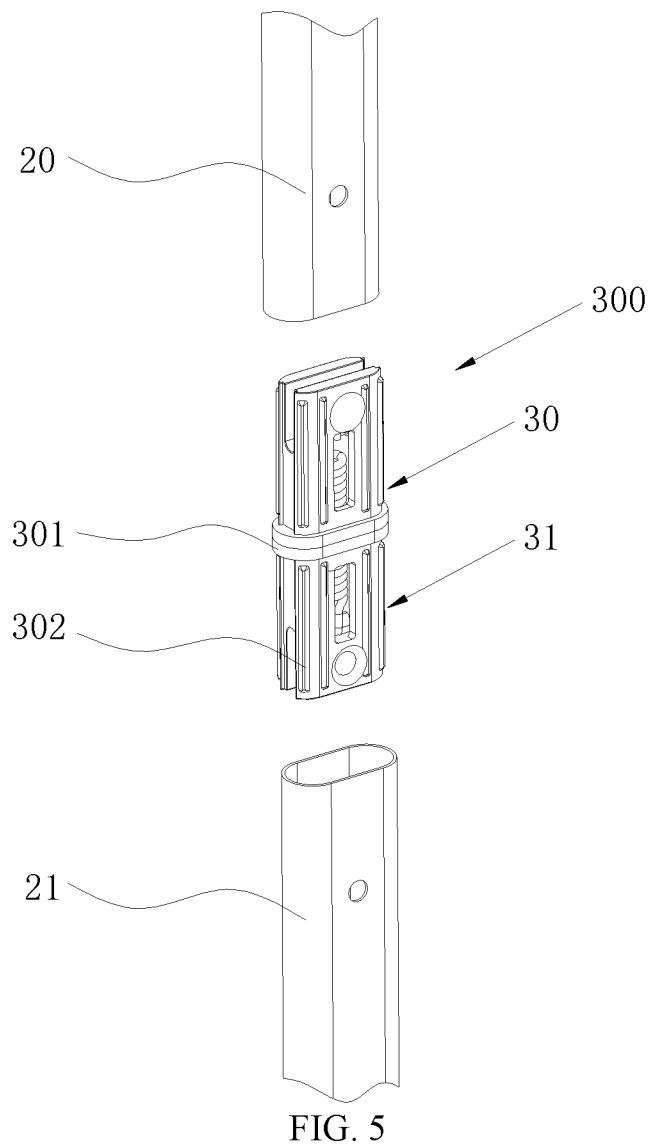
FIG. 5 is a schematic view illustrating connection relationships among a connecting member, the first supporting pipe, and the second supporting pipe of the twistable and foldable shelf according to the first embodiment of the present disclosure.

Each connecting assembly 300 may include a first connecting member 30 and at least one second connecting member 31. Each of the first connecting member 30 and the at least one second connecting member 31 has an end portion 301 and an inserting portion 302. The first connecting member 30 is disposed opposite to or symmetrically with the second connecting member 31; that is, as shown in FIG. 5, the end portion 301 of the first connecting member 30 is disposed adjacent to the end portion 301 of the second connecting member 31, the inserting portion 302 of the first connecting member 30 is disposed away from the second connecting member 31, and the inserting portion 302 of the second connecting member 31 is disposed away from the first connecting member 30. The end portion 301 is substantially in shape of a block with arcs at two opposite ends in a horizontal direction substantially perpendicular to the vertical direction and a cuboid in the middle. An inserting hole 3011 may penetrate the middle of the end portion 301. The inserting hole 3011 may be substantially in shape of a circle, a square, or in other shapes. The inserting portion 302 may define a bottom groove 3021. The bottom groove 3021 may extend or be opened from one end of the inserting portion 302 that is away from the end portion and extend toward the end portion 301, such that the bottom groove 3021 may have a certain depth. In some embodiments, the inserting hole 3011 defined in the end portion 301 may extend toward the inserting portion 302, such that the inserting hole 3011 may communicate with or be fluidly connected to the bottom groove 3021.

According to the design requirements of the end portion 301 and the inserting portion 302 of the connecting assembly, in some embodiments of the present disclosure, the elastic member 303 may be implemented as an extension spring with hooks at two opposite ends. One (first end 303a) of the two opposite ends of the elastic member 303 extends into the inserting hole 3011 of the first connecting member 30, and the other (second end 303b) of two opposite ends of the inserting hole 3011 of the second connecting member 31. Since the inserting hole 3011 communicates with or is fluidly connected to the bottom groove 3021, when the elastic member 303 extends into the inserting holes 3011 of the first connecting member 30 and the second connecting member 31 and continues to extend to the bottom grooves 3021 of the first connecting member 30 and the second connecting member 31, a hooking member 304 is horizontally or laterally disposed in each of the bottom groove 3021 of the first connecting member 30 and the bottom groove 3021 of the second connecting member 31. That is to say, two hooking members 304 are provided, and the two hooking members 304 may be named as the first hooking member and the second hooking member. The first hooking member may be arranged in the bottom groove of the first connecting member 30 and connected to the first end 303a of the elastic member 303, and the first end 303a of the elastic member 303 is movably connected to the first connecting member 30 through the first hooking member. The second hooking member may be arranged in the bottom groove 3021 of the second connecting member 31 and connected to the second end 303b of the elastic member 303, and the second end 303b of the elastic member 303 is movably connected to the second connecting member 31 through the second hooking member. The hooking member 304 is substantially in the shape of a cylinder, such that the hook at one end of the elastic member 303 extending to the bottom groove 3021 may be hooked or caught with a middle of the hooking member 304. Since the hooking member 304 is disposed horizontally in a bottom wall 3021a of the bottom groove 3021, when the elastic member 303 is hooked or caught with the middle of the hooking member 304, the elastic member 303 exerts a pulling force on the hooking member 304, and then the bottom wall 3021a of the bottom groove 3021 blocks and abut against the hooking member 304.

When the first end 30a of the elastic member 303 extends into the inserting hole 3011 of the first connecting member 30 and is further hooked or caught with the first hooking member 304, and the second end 30b of the elastic member 303 extends into the inserting hole 3011 of the second connecting member 31 and is further hooked or caught with the second hooking member 304, the end portion 301 of the first connecting member 30 may be attached to or in contact with or abut against the end portion 301 of the second connecting member 31, and the first connecting member 30 may be movably connected to the second connecting member 31 through the elastic member 303 since the elastic member 303 itself has elasticity. The first connecting member 30 and the second connecting member 31 are generally coaxially arranged in the same line with the connection of the elastic member 303. In some embodiments, under an external force, the first connecting member 30 may be twistable, stackable, or foldable with respect to the second connecting member 31.

In practical applications, the inserting portion 302 of the first connecting member 30 is inserted into a pipe hole of the first supporting pipe 20, and the inserting portion 302 of the second connecting member 31 is inserted into a pipe hole of the second supporting pipe 21. In this way, the first supporting pipe 20 may be movably connected to the second supporting pipe 21 through the interaction between the first connecting member 30 and the second connecting member 31, to form a twistable, stackable, or foldable arrangement.

In general, when the first supporting pipe 20 and the second supporting pipe 21 are connected to each other in the vertical direction through the movable connection between the first connecting member 30 and the second connecting member 31 to form a vertical arrangement, and the plurality of storage members 10 may be erected or supported in the vertical direction, such that the plurality of storage members 10 may be arranged vertically to facilitate use. When the first supporting pipe 20 and the second supporting pipe 21 are connected to each other in the horizontal direction through the movable connection between the first connecting member 30 and the second connecting member 31 to form a horizontal arrangement, the plurality of storage members 10 may be twisted, stacked, or folded in the vertical direction, such that the plurality of storage members 10 are stored for convenient carrying or storage.

In other words, the first supporting pipe 20 and the second supporting pipe 21 are switchable between the vertical arrangement and the horizontal arrangement through the first connecting member 30 and the second connecting member 31. In response to the first supporting pipe 30 and the second supporting pipe 31 being in the vertical arrangement, the first supporting pipe 30 and the second supporting pipe 31 support the plurality of storage members 10 in the vertical direction; and in response to the first supporting pipe 30 and the second supporting pipe 31 being in the horizontal arrangement, the plurality of the storage members 10 are twisted and stacked in the vertical direction.

In this way, by using at least two supporting pipes to support and connect the plurality of storage members 10, the connecting ends of the two supporting pipes are respectively fixedly connected to the connecting members, and each of the connecting members has the end portion 301 and the inserting portion 302. The inserting portion 302 is configured to be inserted or plugged into the pipe hole of the corresponding supporting pipe, and the elastic member 303 is connected to the end portions 301 of the corresponding connecting members, that is to say, the two connecting members of the two supporting pipes may be movably connected to each other via the elastic member 303. The two supporting pipes may achieve the vertical arrangement and a vertical-twistable arrangement under the action of the movable connection of the connecting members. Furthermore, since the plurality of storing members 10 are vertically supported and connected by a plurality of supporting pipes, when the plurality of supporting pipes are vertically twisted and stacked, the plurality of storing members 10 may be driven to be stacked in the vertical direction, and there is no need to repeatedly disassemble and assemble. In this way, it is possible to save space, besides, it is convenient to use, carry, and store.

Figure 6:
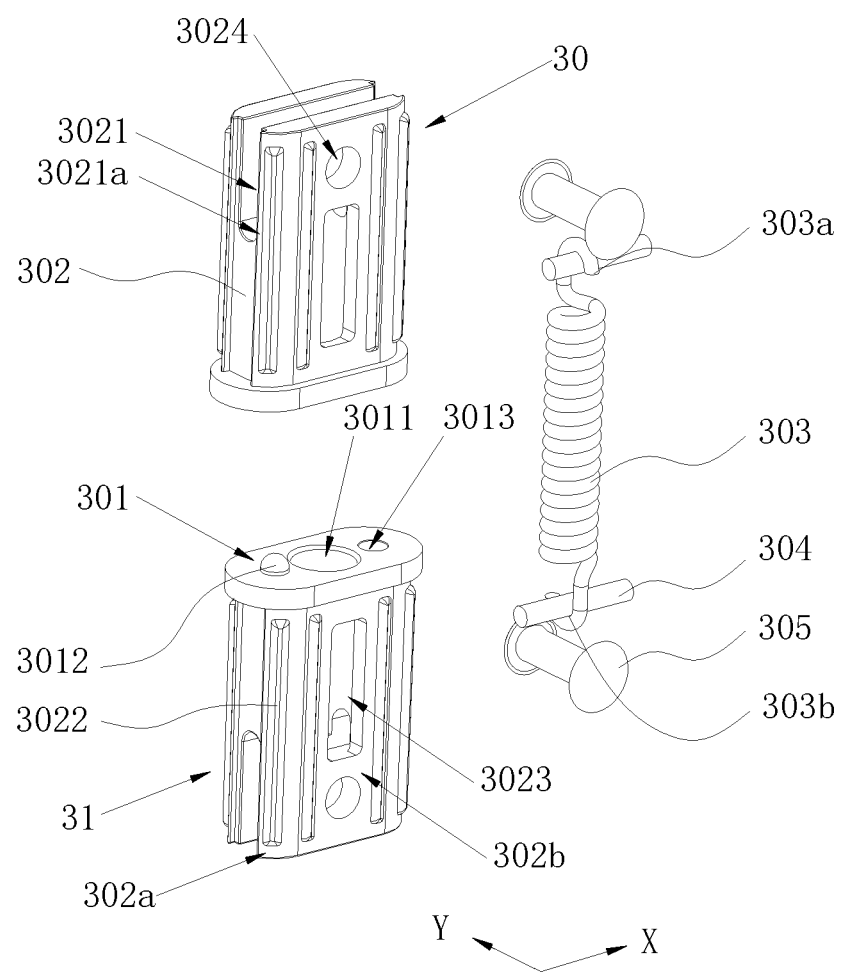
FIG. 6 is a schematic exploded view of the connecting member of the twistable and foldable shelf according to the first embodiment of the present disclosure.
Figure 7:
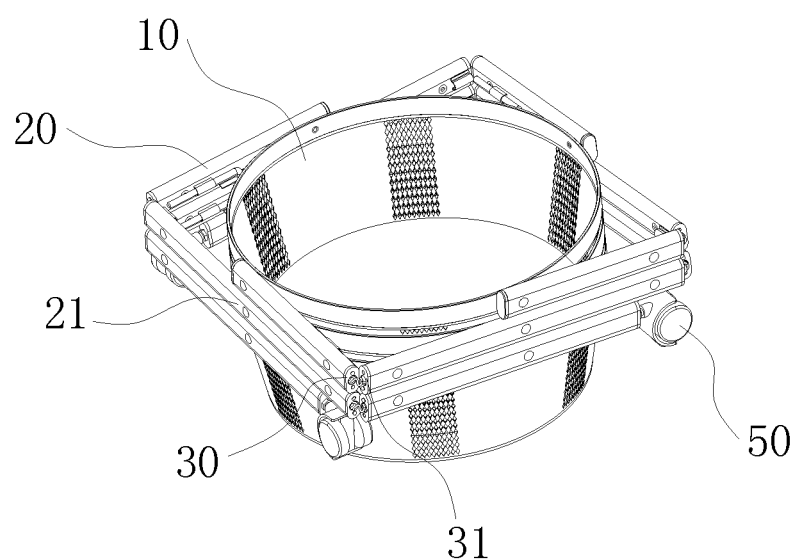
FIG. 7 is a schematic view illustrating a twisted state of the twistable and stackable shelf according to the first embodiment of the present disclosure.

As shown in FIGS. 5-6, the design requirement for the inserting hole 3011 of the end portion 301 is that the inserting hole 3011 in some embodiments of the present disclosure may be configured as a cylindrical or prismatic shape. In some embodiments, the inserting hole 3011 may be in a cylindrical shape. The inserting hole 3011 may be formed by penetrating from the middle of the end portion 301 towards the bottom groove 3021; that is, a bottom end of the inserting hole 3011 extends to an end of the bottom groove 3021 facing the end portion 301. In this case, the end of the bottom groove 3021 facing or adjacent to the end portion 301 is a bottom end of the bottom groove 3021, and the end of the inserting hole 3011 adjacent to the bottom groove 3021. In this way, with the optimal setting of the inserting hole 3011, the bottom end of the inserting hole 3011 may be fluidly connected to the bottom end of the bottom groove 3021, so as to ensure that the hook of the elastic member 303 may smoothly extend through the inserting hole 3011 and further extend into the bottom groove 3021.

The design requirement for the bottom groove 3021 of the connecting member is that, the bottom groove 3021 is processed from the end of the inserting portion 302 away from the end portion 301, and the bottom groove 3021 then extends toward the middle of the inserting portion 302 and terminates/ends until the bottom groove 3021 is fluidly connected to the inserting hole 3011 or ends at the middle position of the inserting portion 302. In some embodiments of the present disclosure, the bottom groove 3021 is also fluidly connected to two opposite first side faces 302a of the inserting portion 302 arranged in a first direction X. Besides, since the hooking member 304 is arranged at the bottom wall 3021a of the bottom groove 3021, the bottom wall 3021a of the bottom groove 3021 may be configured as an arc shape corresponding to the cylindrical shape of the hooking member 304. By configuring the bottom wall 3021a of the bottom groove 3021 into the arc shape, connection surfaces between the hooking member 304 and the bottom groove 3021 may be enlarged, which is effective and convenient for the assembly of the hooking member 304. On the whole, the bottom groove 3021 may have a bifurcation shape at one end of the inserting portion 302 away from the end portion 301, such that two second side faces 302b of the inserting portion 302 are separated from each other in a second direction Y.

In order to facilitate the connection between the elastic member 303 and the connecting members, in some embodiments, each of two opposite second side faces 302b of the inserting portion 302 defines an operation hole 3023. The operation hole 3023 may be substantially elongated in the vertical direction, and the operation hole 3023 may be fluidly connected to the inserting hole 3011 and the bottom groove 3021. Therefore, when the hook of the elastic member 303 is inserted into the bottom groove 3021, the connection between the hook of the elastic member 303 and the hooking member 304 may be adaptively adjusted through the operation hole 3023. Of course, by defining the operation hole 3023 in the inserting portion 302, an overall weight of the connecting member and the manufacturing cost may also be reduced.

In order to achieve a stable connection effect between the connecting assembly and the supporting assembly, a fixing hole 3024 may be defined at one side of the operation hole 3023. As shown in FIG. 6, the fixing hole 3024 may be defined above the operation hole 3023 along the vertical direction. The fixing hole 3024 is substantially circular. The fixing hole 3024 may penetrate the two second side faces 302b of the inserting portion 302 and be fluidly connected to the bottom groove 3021; that is, the fixing holes 3024 defined at both second side faces 302b of the inserting portion 302 correspond to each other and arranged coaxially. Similarly, a riveting hole 22 may be defined in each of the first supporting pipe 20 and the second supporting pipe 21, and the riveting hole 22 corresponds to the fixing hole 3024 defined in the inserting portion 302. When the inserting portions 302 of the first and second connecting members are inserted into the corresponding pipe holes of the first supporting pipe 20 and the second supporting pipe 21, the first and second connecting members may be stably inserted into the first and second supporting pipes by inserting a fixing member 305 into the fixing hole 3024 and the riveting hole 22. In some embodiments, the fixing member 305 may be a rivet, a screw rod, or a bolt.

As shown in FIG. 5 and FIG. 6, a plurality of reinforcing ribs 3022 are arranged on an outer periphery of the inserting portion 302. Distances between every two adjacent of the plurality of reinforcing ribs 3022 may be equidistant or non-equidistant. In some embodiments, one or two reinforcing ribs 3022 may be arranged at each side of the operating hole 3023. The reinforcing ribs 3022 may be formed by protruding from an outer peripheral surface of the inserting portion 302 in a direction away from the outer peripheral surface. The reinforcing ribs 3022 may be substantially elongated and may be cylindrical or semi-cylindrical. One end of each of the reinforcing ribs 3022 may extend toward the end of the inserting portion 302 connected to the end portion 301, and the other end of the reinforcing rib 3022 may extend toward the end of the inserting portion 302 away from the end portion 301. By arranging the plurality of reinforcing ribs 3022 on the outer periphery of the inserting portion 302, a connection tightness between the inserting portion 302 and an inner wall of the corresponding supporting pipe may be effectively improved.

In order to further improve the connection stability between the first connecting member 30 and the second connecting member 31, in some embodiments, a restricting member 3012 may be disposed on each of the end portion 301 of the first connecting member 30 and the end portion 301 of the second connecting member 31, and a restricting hole 3013 may be further defined in each of the end portion 301 of the first connecting member 30 and the end portion 301 of the second connecting member 31. The restricting member 3012, the restricting hole 3013, and the inserting hole 3011 are on the same plane. The inserting hole 3011 may be defined in the middle of the end portion 301. In this way, the restricting member 3012 and the restricting hole 3013 may be arranged on two opposite sides of the inserting hole 3011, respectively. Thus, when the end portion 301 of the first connecting member 30 is connected to the end portion 301 of the second connecting member 31, the restricting member 3012 of the first connecting member 30 matches with and is further engaged with the restricting hole 3013 of the second connecting member 31, and the restricting member 3012 of the second connecting member 31 matches with and is further engaged with the restricting hole 3013 of the first connecting member 30. That is, the restricting member 3012 of the first connecting member 30 and the restricting member 3012 of the second connecting member 31 are staggered with each other, and the restricting hole 3013 of the first connecting member 30 and the restricting hole 3013 of the second connecting member 31 are staggered with each other. The restricting member 3012 may be configured as a hemispherical shape, a cylindrical shape, a prismatic shape, or a conical shape.

Figure 2:
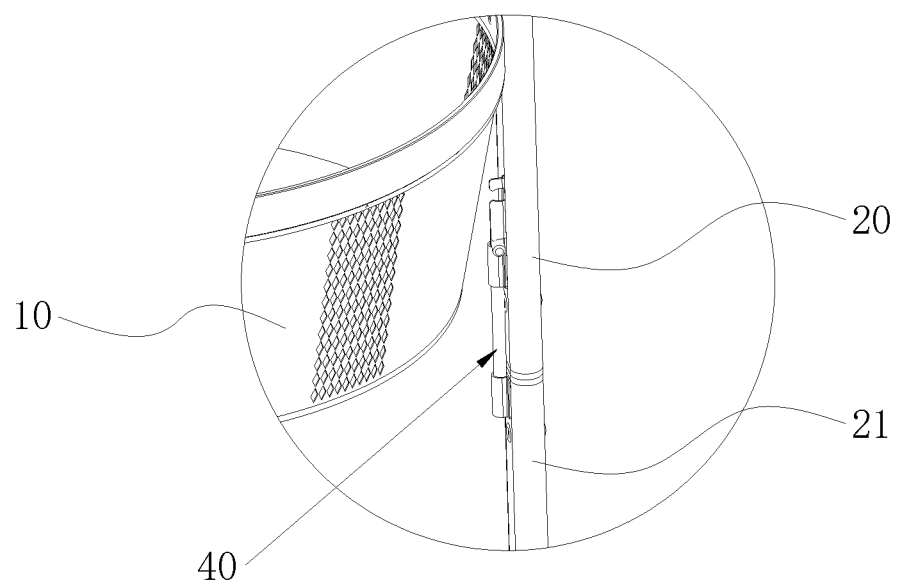
FIG. 2 is an enlarged view of a part A shown in FIG. 1.
Figure 3:
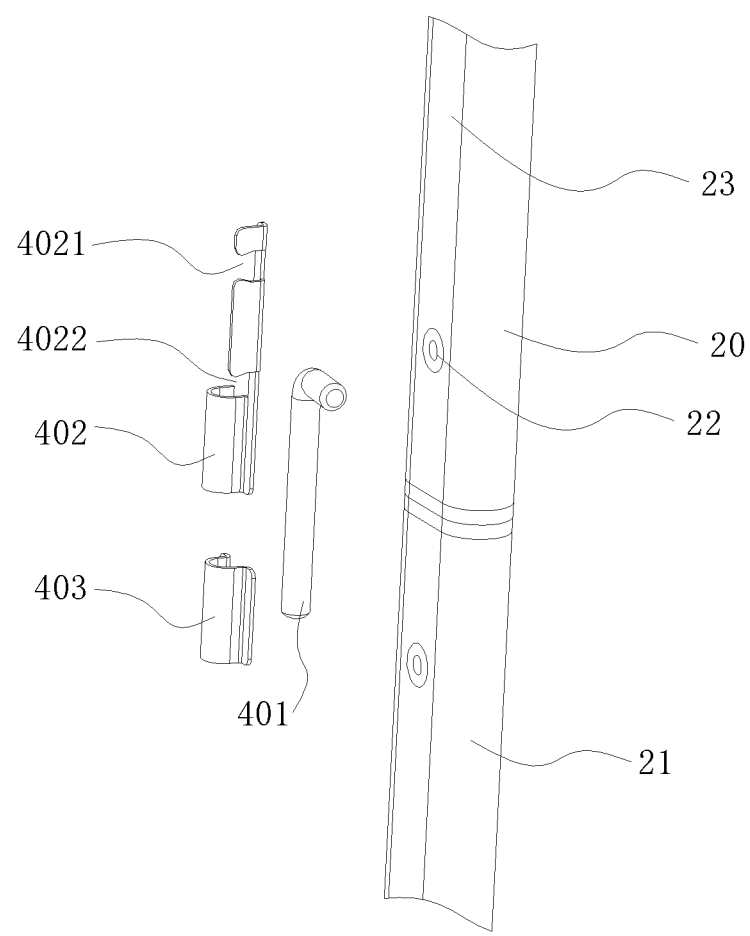
FIG. 3 is a view illustrating an exploded structure of a locking member of the twistable and foldable shelf according to the first embodiment of the present disclosure, and illustrating connection relationships among the locking member, a first supporting pipe, and a second supporting pipe.
Figure 4:
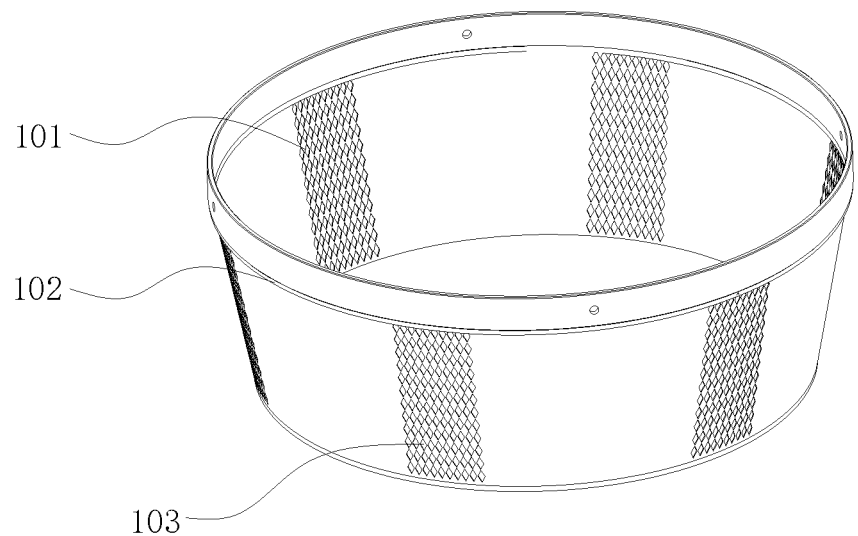
FIG. 4 is a perspective view of a storing member of the twistable and foldable shelf according to the first embodiment of the present disclosure.

When the first supporting pipe 20 and the second supporting pipe 21 in some embodiments of the present disclosure are in the vertical arrangement, in order to improve the stable connection between the first supporting pipe 20 and the second supporting pipe 21, as shown in FIGS. 1-3, a locking member 40 is arranged on inner side faces 23 of the first supporting pipe 20 and the second supporting pipe 21 at the ends of the first supporting pipe 20 and the second supporting pipe 21 connected to each other, and the inner side faces 23 of the first supporting pipe 20 and the second supporting pipe 21 face the storing members 10. The first supporting pipe 20 and the second supporting pipe 21 are fixed via the locking member 40 in the vertical direction. Of course, when the first supporting pipe 20 and the second supporting pipe 21 need to be arranged in the twisted arrangement, the locking member 40 may be unlocked first.

More specifically, the locking member 40 may include a latching element 401, an upper locking element 402, and a lower locking element 403. The upper locking element 402 may be fixedly connected to the inner side face 23 of the first supporting pipe 20 facing the storing members 10. The lower locking element 403 may be fixedly connected to the inner side face 23 of the second supporting pipe 21 facing the storing members 10. The upper locking element 402 and the lower locking element 403 are connected to or separated from each other through a latching element 401. The upper locking element 402 has an upper engaging notch 4021 and a lower engaging notch 4022. In practical applications, an upper end of the latching element 401 has an bending head, a lower end of the latching element 401 is inserted from the upper locking element 402, and then the bending head of the latching element 401 may be engaged in the upper engaging notch 4021 or the lower engaging notch 4022. When the bending head of the latching element 401 is buckled to or engaged in the upper engaging notch 4021, the lower end of the latching element 401 is separated from the lower locking element 403. When the bending head of the latching element 401 is buckled to or engaged in the lower engaging notch 4022, the lower end of the latching element 401 is connected to the lower latching element 403. At this time, the lock member 40 may lock the first supporting pipe 20 and the second supporting pipe 21 to improve the connection stability.

In some embodiments of the present disclosure, the supporting assembly, the connecting assembly, the elastic member 303, the hooking member 304, and the locking member 40 may be configured as a connecting device for connecting and supporting the storage members 10.

Second Embodiment

The difference between the second embodiment and the first embodiment lies in a structural design and an arrangement of the locking member 40 and a structure of the storing member 10, while the rest are the same. More specifically, the following description will be made.

The storing member 10 in the second embodiment of the present disclosure may be configured in a square shape or a truncated pyramid shape. In the second embodiment, the storing member 10 may be in the truncated pyramid shape, and the storing member 10 may be a hanging basket, a hanging box, a hanging case, or the like.

Figure 8:
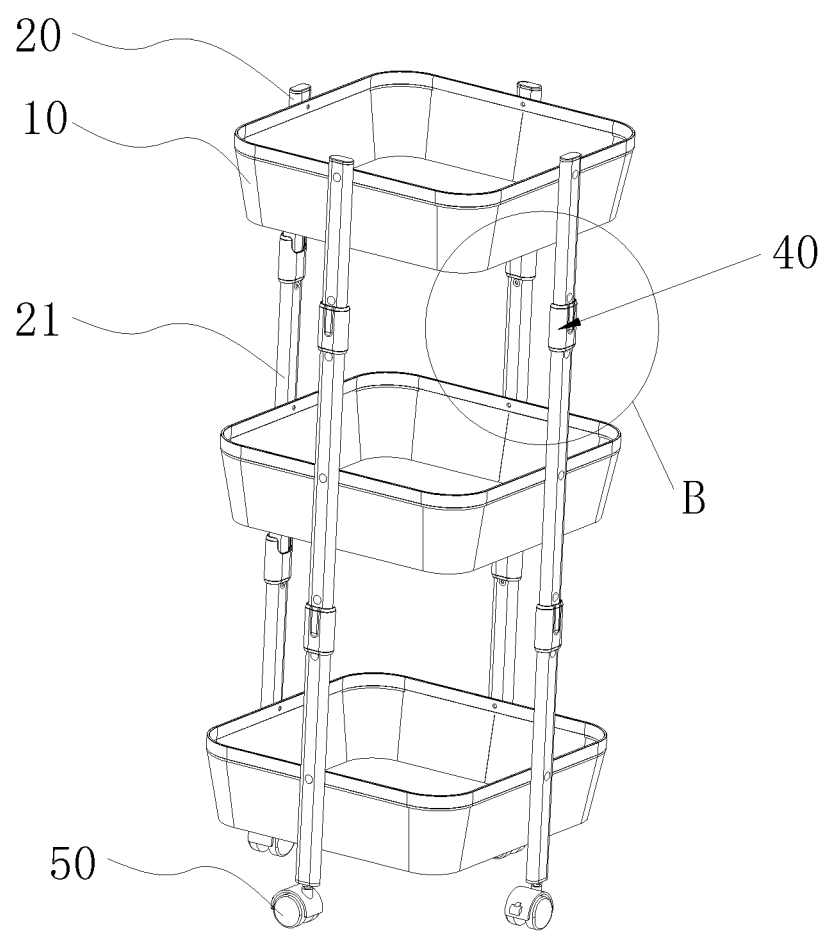
FIG. 8 is an overall perspective view of the twistable and foldable shelf according to a second embodiment of the present disclosure.
Figure 9:
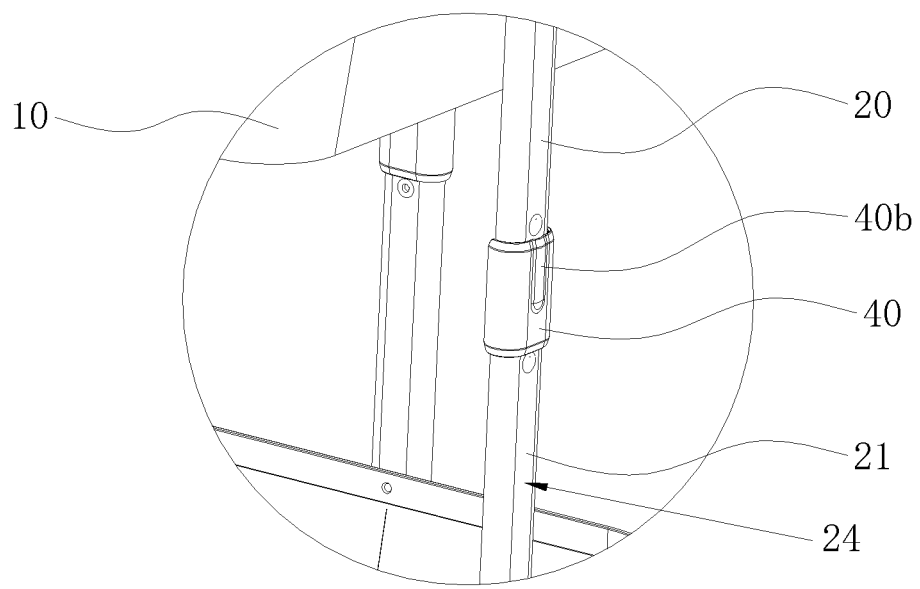
FIG. 9 is the enlarged view of a part B shown in FIG. 8.
Figure 10:
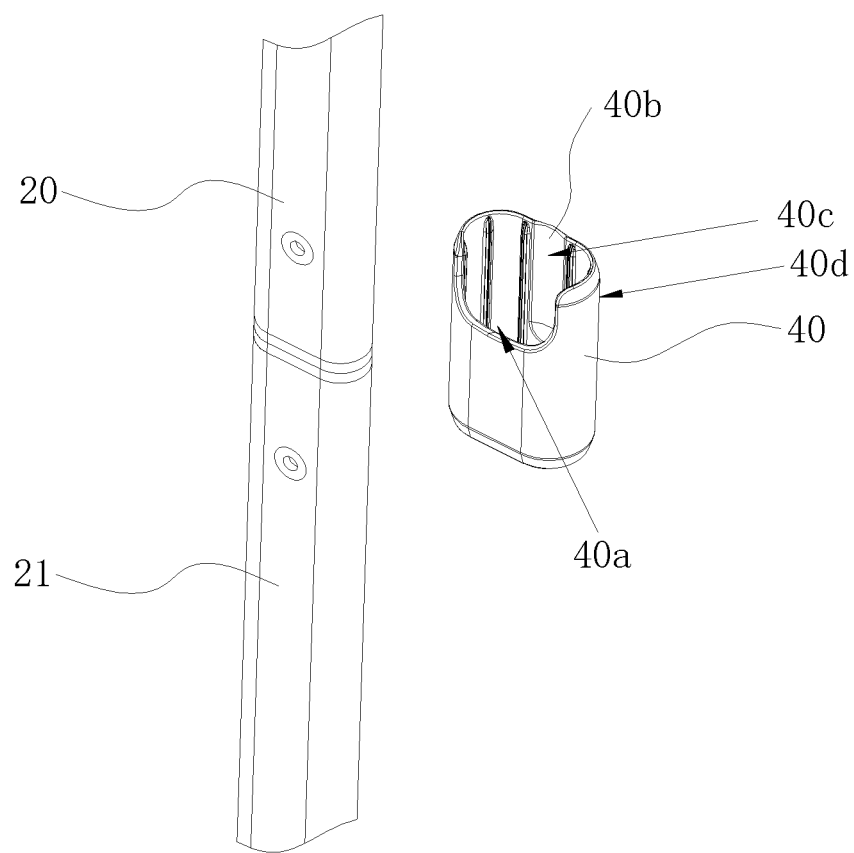
FIG. 10 is a view illustrating an exploded structure of a locking member of the twistable and foldable shelf according to the first embodiment of the present disclosure, and illustrating connection relationships among the locking member, a first supporting pipe, and a second supporting pipe.

When the first supporting pipe 20 and the second supporting pipe 21 in the second embodiment of the present disclosure are in the vertical arrangement, in order to improve the stable connection between the first supporting pipe 20 and the second supporting pipe 21, as shown in FIGS. 8-10, the locking member 40 is arranged on outer side faces 24 of the first supporting pipe 20 and the second supporting pipe 21 at the connecting ends of the connecting end of the first supporting pipe 20 and the second supporting pipe 21, and the first supporting pipe 20 is a vertically and fixedly connected to the second supporting pipe 21 through the locking member 40. The outer side faces 24 of the first and second supporting pipes 20 and 21 may be opposite to the inner side faces 23 of the first and second supporting pipes 20 and 21, and face away from the plurality of storing members 10. Of course, when the first supporting pipe 20 and the storing member 10 need to be arranged in the twisted arrangement, the locking member 40 may be removed to unlock first. The operation is simple and convenient.

More specifically, the locking member 40 in the second embodiment of the present disclosure is generally in shape of a tube made of metal material or plastic material. An upper port of the locking member 40 or a connecting end of the locking member 40 connected to the first supporting pipe 20 defines a fully-opened or half-opened opening 40a. The locking member 40 may be assembled on the end of the first supporting pipe 20 that is connected to the first connecting member 30 through the opening 40a, and then a lower port of the locking member 40 is connected to the end of the second supporting pipe 21 that is connected to the second connecting member 31. In this way, it is possible to strengthen the connection tightness between the first supporting pipe 20 and the second supporting pipe 21. In some embodiments, a guiding groove 40b may be defined on an inner side face 40c of the locking member 40, or in other words, the guiding groove 40b may be defined on the side face 40c of the locking member 40 facing or opposite to the opening 40a. The guiding groove 40b may protrude from the inner side face 40c of the locking member 40 towards an outer side face 40d of the locking member 40, and the outer side face 40d is opposite to the inner side face 40c. The guiding groove 40b may extend a certain distance to the middle of the locking member 40 from the upper end of the locking member 40.

In practical applications, since the first supporting pipe 20 and the second supporting pipe 21 are fixedly connected to the connecting members through the fixing member 305, the guiding groove 40b defined in the locking member 40 may be connected to an outer end of the fixing member 305. It may be seen that, when assembling the locking member 40, the locking member 40 may be mounted into the end of the first supporting pipe 20 that is connected to the first connecting member 30, and at this time, the fixing member 305 of the first supporting pipe 20 may be slid into the guiding groove 40b of the locking member 40. Then the end of the second supporting pipe 21 that is connected to the second connecting member 31 may be mounted into the lower port of the locking member 40, and at this time, the locking member 40 may be slid such that the lower end of the locking member 40 is engaged and locked in a position above the fixing member 305 of the second supporting pipe 21. That is, when the locking member 40 is engaged with the first supporting pipe 20 and the second supporting pipe 21, the outer end of the fixing member 305 may also provide a restricting and anti-slip effect on the locking member 40.

It will be apparent to those skilled in the art that various modifications and variations may be made in the present disclosure without departing from the spirit and scope of the present disclosure. Thus, in case that these modifications and variations of the present disclosure fall within the scope of the claims of the present disclosure and their equivalents, the present disclosure is also intended to include these modifications and variations.

What is claimed is:

1. A twistable and stackable shelf, comprising:
    a plurality of storage members, configured to hold items;
    a supporting assembly, comprising a first supporting pipe and at least one second supporting pipe;
    a connecting assembly, comprising a first connecting member and at least one second connecting member, the first connecting member being connected to the first supporting pipe, and the at least one second connecting member being connected to a corresponding one of the second supporting pipe, wherein each of the first connecting member and the at least one second connecting member comprises an end portion and an inserting portion, each end portion defines an inserting hole, each inserting portion defines a bottom groove, and the inserting hole is fluidly connected to the bottom groove; wherein each bottom groove is formed by extending from one end of the inserting portion away from the end portion towards a middle of the inserting portion;
    an elastic member, having a first end and a second end opposite to the first end, the first end of the elastic member being inserted into the inserting hole of the first connecting member and extending to the bottom groove of the first connecting member, and the second end of the elastic member being inserted into the inserting hole of the second connecting member and extending to the bottom groove of the second connecting member;
    a first hooking member, arranged in the bottom groove of the first connecting member, and connected to the first end of the elastic member, and the first end of the elastic member being movably connected to the first connecting member through the first hooking member; and
    a second hooking member, arranged in the bottom groove of the second connecting member and connected to the second end of the elastic member, and the second end of the elastic member being movably connected to the second connecting member through the second hooking member;
    wherein the first supporting pipe and the at least one second supporting pipe are switchable between a vertical arrangement and a horizontal arrangement through the first connecting member and the at least one second connecting member;
    in response to the first supporting pipe and the at least one second supporting pipe being in the vertical arrangement, the first supporting pipe and the at least one second supporting pipe support the plurality of storage members in a vertical direction; and
    in response to the first supporting pipe and the at least one second supporting pipe being in the horizontal arrangement, the plurality of the storage members are configured to be twisted and stacked in the vertical direction.

2. The twistable and stackable shelf as claimed in claim 1, wherein the inserting hole of each of the first and second connecting members penetrates from the end portion towards the bottom groove, and the inserting hole is in a cylindrical shape or a prismatic shape.

3. The twistable and stackable shelf as claimed in claim 1, wherein each bottom groove is fluidly connected to two opposite first side faces of the inserting portion arranged in a first direction, and a bottom wall of each bottom groove is in an arc shape.

4. The twistable and stackable shelf as claimed in claim 3, wherein each bottom groove has a bifurcation shape at the one end of the inserting portion away from the end portion, such that two opposite second side faces of the inserting portion are separated from each other in a second direction.

5. The twistable and stackable shelf as claimed in claim 4, wherein each of the two opposite second side faces of the inserting portion of each of the first and second connecting members defines an operation hole, and the operation hole is fluidly connected to the inserting hole and the bottom groove;
   a fixing hole is defined at one side of the operation hole, the fixing hole penetrates the two opposite second side faces of the inserting portion of each of the first and second connecting members and is fluidly connected to the bottom groove;
   a riveting hole is defined in each of the first supporting pipe and the second supporting pipe, and the riveting holes correspond to the fixing hole defined in each inserting portion; the inserting portion of the first connecting member is inserted into the first supporting pipe, the inserting portion of the second connecting member is inserted into the second supporting pipe, and a fixing member is riveted with each fixing hole and each riveting hole.

6. The twistable and stackable shelf as claimed in claim 3, wherein the first hooking member is arranged at the bottom wall of the bottom groove of the first connecting member, and the second hooking member is arranged at the bottom wall of the bottom groove of the second connecting member.

7. The twistable and stackable shelf as claimed in claim 1, wherein a plurality of reinforcing ribs are arranged on an outer periphery of the inserting portion of each of the first and second connecting members, one end of each of the reinforcing ribs extends towards one end of the inserting portion connected to the end portion, and the other end of each of the reinforcing ribs extends towards the other end of the inserting portion away from the end portion.

8. The twistable and stackable shelf as claimed in claim 1, wherein a restricting member is disposed on each of the end portion of the first connecting member and the end portion of the second connecting member, and a restricting hole is defined in each of the end portion of the first connecting member and the end portion of the second connecting member;
   the restricting member of the first connecting member matches with and is further engaged with the restricting hole of the second connecting member, and the restricting member of the second connecting member matches with and is further engaged with the restricting hole of the first connecting member; and
   the restricting member is hemispherical, cylindrical, prismatic, or conical.

9. The twistable and stackable shelf as claimed in claim 8, wherein the restricting member, the restricting hole, and the inserting hole are on the same plane, and the restricting member and the restricting hole are arranged on two opposite sides of the inserting hole, respectively.

10. The twistable and stackable shelf as claimed in claim 9, wherein the restricting member of the first connecting member and the restricting member of the second connecting member are staggered with each other, and the restricting hole of the first connecting member and the restricting hole of the second connecting member are staggered with each other.

11. The twistable and stackable shelf as claimed in claim 1, further comprising a locking member, wherein the locking member is arranged on inner side faces at connecting ends of the first supporting pipe and the second supporting pipe, and the first supporting pipe forms a vertical fixed connection with the second supporting pipe through the locking member;
   wherein the inner side faces face the plurality of storage members.

12. The twistable and stackable shelf as claimed in claim 11, wherein the locking member comprises a latching element, an upper locking element, and a lower locking element, the upper locking element is fixedly connected to the inner side face of the first supporting pipe, the lower locking element is fixedly connected to the inner side face of the second supporting pipe, and the latching element is movably connected to the upper locking element and the lower locking element;
   the upper locking element has an upper engaging notch and a lower engaging notch, and an upper end of the latching element is engaged with the upper engaging notch or the lower engaging notch.

13. The twistable and stackable shelf as claimed in claim 1, further comprising a locking member, wherein the locking member is arranged on outer side faces at connecting ends of the first supporting pipe and the second supporting pipe, and the first supporting pipe forms a vertical fixed connection with the second supporting pipe through the locking member, wherein the outer side faces face away from the plurality of storage members;
   a side of the locking member facing the first supporting pipe and the second supporting pipe defines an opening, and the locking member is assembled to the first supporting pipe and the second supporting pipe through the opening;
   a side face of the locking member opposite to the opening defines a guiding groove, and the guiding groove matches with a fixing member connected to the first supporting pipe and a fixing member connected to the second supporting pipe.

14. The twistable and stackable shelf as claimed in claim 13, wherein the guiding groove protrudes from an inner side face of the locking member towards an outer side face of the locking member;
   the fixing member connected to the first supporting pipe is slid into the guiding groove, and the locking member is located above the fixing member connected to the second supporting pipe.

15. The twistable and stackable shelf as claimed in claim 1, wherein the first hooking member is horizontally disposed in the bottom groove of the first connecting member and the second hooking member is horizontally disposed in the bottom groove of the second connecting member;
   when the first end of the elastic member is hooked with the first hooking member and the second end of the elastic member is hooked with the second hooking member, the first hooking member abuts against a bottom wall of the bottom groove of the first connecting member, and the second hooking member abuts against a bottom wall of the bottom groove of the second connecting member.

16. The twistable and stackable shelf as claimed in claim 1, wherein when the first end of the elastic member extends into the inserting hole of the first connecting member and is further hooked with the first hooking member and the second end of the elastic member extends into the inserting hole of the second connecting member and is further hooked with the second hooking member, the end portion of the first connecting member abuts against the end portion of the second connecting member.

17. The twistable and stackable shelf as claimed in claim 16, wherein the first connecting member and the second connecting member are generally coaxially arranged via the elastic member, and the first connecting member is twistable with respect to the second connecting member.

18. The twistable and stackable shelf as claimed in claim 1, wherein the number of the second supporting pipes is one, and the number of the connecting assemblies is one, the connecting assembly is arranged between the first supporting pipe and one second supporting pipe; or
the number of the second supporting pipes is two or more, and the number of the connecting assemblies is two or more, wherein one of the two or more connecting assemblies is arranged between the first supporting pipe and one of the second supporting pipes, and the other of the two or more connecting assemblies are arranged between every two adjacent of the second supporting pipes.

19. The twistable and stackable shelf as claimed in claim 18, wherein the number of the connecting assemblies corresponds to the number of the second supporting pipes in a one-to-one correspondence.

20. A connecting device for connecting and supporting a plurality of storage members of a twistable and stackable shelf, the connecting device comprising:
a supporting assembly, comprising a first supporting pipe and at least one second supporting pipe;
a connecting assembly, comprising a first connecting member and at least one second connecting member, the first connecting member being connected to the first supporting pipe, and the at least one second connecting member being connected to a corresponding one of the second supporting pipe, wherein each of the first connecting member and the at least one second connecting member comprises an end portion and an inserting portion, each end portion defines an inserting hole, each inserting portion defines a bottom groove, and the inserting hole is fluidly connected to the bottom groove; wherein each bottom groove is formed by extending from one end of the inserting portion away from the end portion towards a middle of the inserting portion;
an elastic member, having a first end and a second end opposite to the first end, the first end of the elastic member being inserted into the inserting hole of the first connecting member and extending to the bottom groove of the first connecting member, and the second end of the elastic member being inserted into the inserting hole of the second connecting member and extending to the bottom groove of the second connecting member;
a first hooking member, arranged in the bottom groove of the first connecting member, and connected to the first end of the elastic member, and the first end of the elastic member being movably connected to the first connecting member through the first hooking member; and
a second hooking member, arranged in the bottom groove of the second connecting member and connected to the second end of the elastic member, and the second end of the elastic member being movably connected to the second connecting member through the second hooking member;
wherein the first supporting pipe and the at least one second supporting pipe are switchable between a vertical arrangement and a horizontal arrangement through the first connecting member and the at least one second connecting member;
in response to the first supporting pipe and the at least one second supporting pipe being in the vertical arrangement, the first supporting pipe and the at least one second supporting pipe support the plurality of storage members in a vertical direction; and
in response to the first supporting pipe and the at least one second supporting pipe being in the horizontal arrangement, the plurality of the storage members are configured to be twisted and stacked in the vertical direction.

\* \* \* \* \*